(12) United States Patent
Mestyanek

(10) Patent No.: US 6,485,307 B1
(45) Date of Patent: Nov. 26, 2002

(54) DEVICE, KIT AND METHOD FOR LEARNING TO TIE FISHING KNOTS

(75) Inventor: Lawrence W. Mestyanek, Los Angeles, CA (US)

(73) Assignee: Tag Toys, Compton, CA (US)

( * ) Notice: Subject to any disclaimer, the term of this patent is extended or adjusted under 35 U.S.C. 154(b) by 0 days.

(21) Appl. No.: 09/503,621

(22) Filed: Feb. 11, 2000

(51) Int. Cl.[7] .............................................. G09B 19/24
(52) U.S. Cl. ...................................... 434/260; 434/258
(58) Field of Search ............................... 434/258, 247, 434/260; 289/18.1, 17

(56) References Cited

U.S. PATENT DOCUMENTS

| | | | | |
|---|---|---|---|---|
| D143,237 S | * | 12/1945 | Pares ............................ D8/18 |
| 2,469,037 A | * | 5/1949 | Harvey ......................... 289/17 |
| 2,498,920 A | * | 2/1950 | Holland ........................ 289/17 |
| 2,624,957 A | * | 1/1953 | Collins ......................... 289/17 |
| 2,773,713 A | * | 12/1956 | Smalley ....................... 289/17 |
| 3,700,272 A | * | 10/1972 | Bauer ........................... 289/17 |
| 4,017,984 A | * | 4/1977 | Bonfigli ....................... 434/260 |
| 4,417,756 A | * | 11/1983 | Herke ........................... 289/2 |
| 4,607,869 A | * | 8/1986 | Bersche ........................ 289/17 |
| 4,871,200 A | * | 10/1989 | Ryder ........................... 289/17 |
| 5,240,295 A | * | 8/1993 | Spencer ....................... 289/1.5 |
| 5,690,370 A | * | 11/1997 | Steck ........................... 289/17 |
| 6,015,172 A | * | 1/2000 | Williams ...................... 289/2 |
| 6,217,086 B1 | * | 4/2001 | LeTourneau ................ 289/18.1 |

\* cited by examiner

Primary Examiner—Derris H. Banks
Assistant Examiner—Kurt Fernstrom
(74) Attorney, Agent, or Firm—Arter & Hadden LLP

(57) ABSTRACT

A device, kit, and method for learning, teaching or self-teaching to tie knots, especially when applied to fishing line or other flexible elongated material. The apparatus comprises a body having top and bottom sides opposite to one another, the top side being provided with a center, left, right, front and back areas, and the bottom side generally provided for resting the device an a surface, a first prong member extending upwardly from the top side of the body, and a length of flexible material, such as, a line, thread cord or rope, that is operatively attached to the top side of the body. The flexible material having distal and proximal ends whereby an operator operating the device may thread the proximal end of the flexible material through an opening of a second prong member in a pre-set pattern to form a knot.

18 Claims, 10 Drawing Sheets

DEVICE, KIT AND METHOD FOR LEARNING TO TIE FISHING KNOTS

RELATED APPLICATIONS

This patent application is related to, and claims priority of, a design application entitled FISHING KNOT LEARNING CENTER filed Feb. 10, 2000, by the same inventor.

BACKGROUND OF THE INVENTION

1. Field of the Invention

The present invention relates to a device, kit and method for learning, teaching or self-teaching to tie knots, especially when applied to a fishing line material. The device of the invention facilitates the learning of the art of tying knots in a flexible elongated material, and is simple in design and use. The method for learning to tie knots is designed primarily for use with the device or kit of the invention.

2. Description of the Background

Up to the present time it has proved difficult to learn to tie knots while performing another function or in the midst of a different activity, such as performing surgery or going fishing. In the case of a fisherman/woman, at the same time he/she learns to tie a knot, he/she has to, for example, hook a fly or other bait, ready the fishing rod, accommodate any means of transportation used, and handle the necessary clothing which will be adequate for the weather encountered. In endeavoring to tie a knot under these circumstances, the fisherman/woman encounters the problem that to effectively learn to tie a knot generally requires undivided attention, dedication and practice, all of which are practically impossible to attain on site. Thus, fishing becomes extremely costly and frustrating while yielding less than expected results.

Finally, tying knots by hand, such as when tying fishing knots, requires a fairly high degree of hand and finger dexterity. Persons afflicted with arthritis, the elderly and children, to name a few, a particularly difficult time tying knots. In this society, moreover, which values convenience and the avoidance of tedium, a consumer needs all the help he/she may get in accomplishing tasks such as tying knots. The consumer market clearly needs a clever, simple and low cost specialty tool designed specifically to make the learning of knot-tying easier, faster and less painful, and that permits repeated and leisurely exercise of the skill prior to a time when it is needed. The present invention is directed to a device that has been designed to fill this need.

There is therefore a need for providing a means to learn to tie knots in the privacy of the home which will aid in securing adequate preparation at the time the skill is needed, be it during surgery or in a fishing trip. The present invention provides a solution to that problem.

SUMMARY OF THE INVENTION

The present invention provides a device for learning to tie knots, particularly fishing knots, that is simple to utilize and inexpensive to implement. It permits the repeated practice away from any pressures imparted by the imminence of the need for performance on the site. In a most common embodiment, the knot-tying device is useful for learning to manually tie a knot in a flexible material, and comprises

- a body having top and bottom sides opposite to one another, the top side being provided with a center, left, right, front and back areas, and the bottom side generally provided for resting the device on a surface;
- a first prong member extending upwardly from the top side of the body; and
- a length of flexible material operatively attached to the top side of the body, the flexible material having distal and proximal ends, whereby an operator operating the device may thread the proximal end of the flexible material through an opening of a second prong member in a pre-set pattern to form a knot. Other elements may also be added as described below.

In addition, this invention also provides a kit for practicing and learning to tie knots, comprising the device of the invention, other optional components, and instructions for learning to tie a variety of knots, particularly those that are suitable for use with fishing rods, bait and flies. The kit of the invention in its basic form comprises the elements of the device described above separately or partially or fully assembled. Typically, the knot-tying kit, comprises the device of the invention, a second prong member provided with a pre-defined size opening for threading through it the flexible material when tying a knot, wherein when not in use, the second prong member is either lain in the kit, or is operatively attached to the top side of the body at a side other than the first prong member, and instructions for learning to tie a plurality of knots.

In one embodiment, it is provided a mechanism that will prevent any subject handling the device from being harmed, without requiring especial concern for his/her safety. This is attained by securing the fishing hook so that it will not be untethered.

The present invention includes a platform, to which a means or support is secured to hold a thread, e. g. a fishing line, by a first end thereof. A hook, fly, tackle, bait or other fishing object that is provided with a means for securing the thread, e. g. a fishing line, may be tied onto the thread by employing the device of this invention.

In another embodiment, a distal end of the flexible material, e. g. thread, line, cord, etc., is wound on a line-winding mechanism, e. g. a spool. The spool may also be fixed without permitting any winding. In another embodiment, the kit provides a line cutter and/or a watch. Clearly, both these elements may be simply ornamental, or they may be employed for, e.g. cutting the line when a new knot tying practice lesson is to be started in the case of the cutter. On the other hand, the watch may be employed for measuring the time required to tie a knot and following the progress of the subject's learning.

Also part of the present invention is a method for learning, teaching or self-teaching to tie knots utilizing the device of this invention, which method provides the necessary knowledge and ability for readying equipment, e. g. surgical and fishing equipment at any time. Practicing the present method with the aid of the present invention will enable a better utilization of resources and lower the cost of any subsequently undertaken activity utilizing this ability. This, in addition, will also help to protect the equipment, e. g. fishing lines and fishing rods.

The present invention will be best understood through the following description and accompanying drawings, that are described below.

DETAILED DESCRIPTION OF THE PREFERRED EMBODIMENTS

Figure 1:
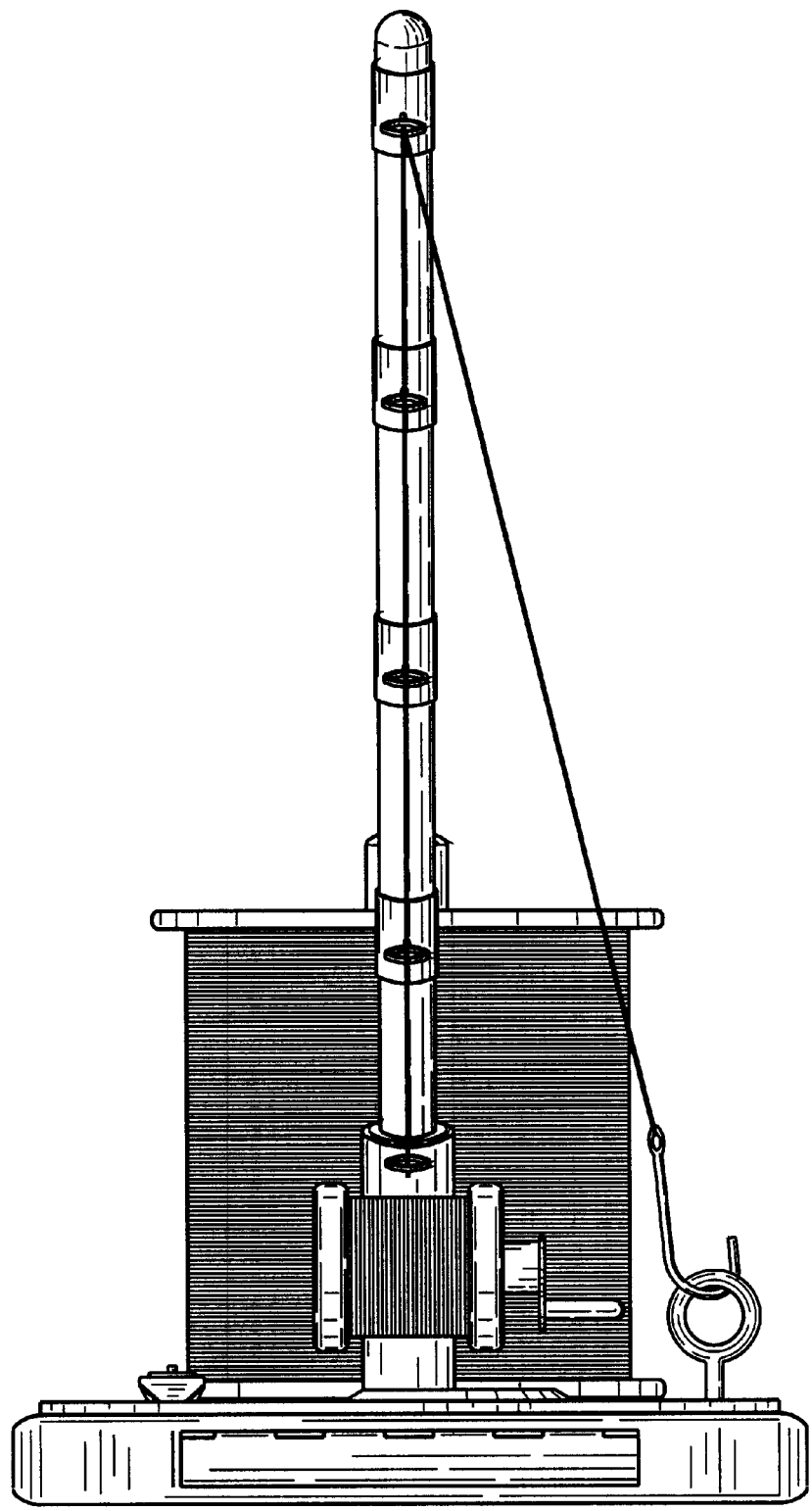
FIG. 1 is a perspective front view of the fishing knot learning center with the hook tethered showing the design.
Figure 2:
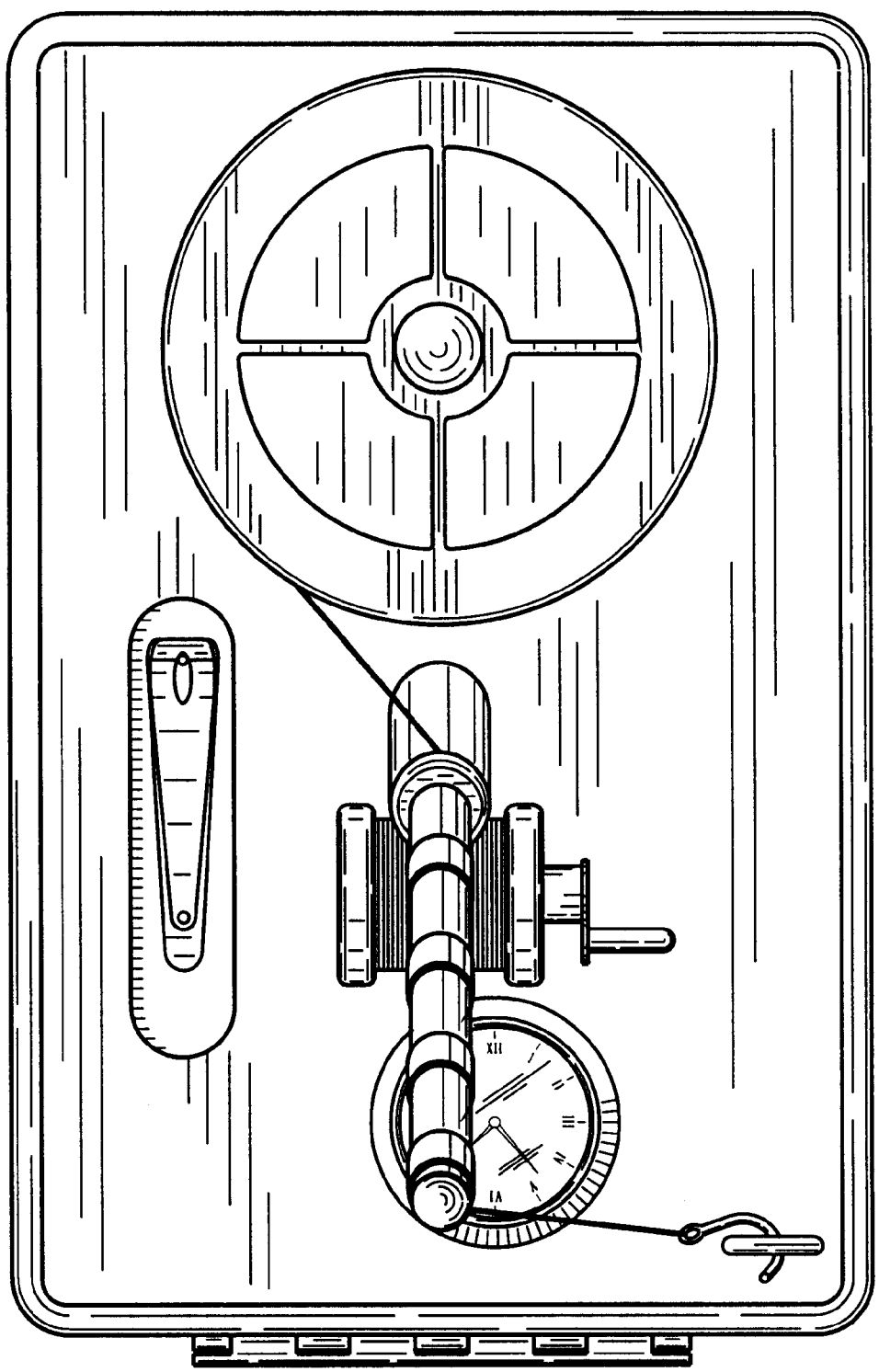
FIG. 2 is a top view thereof.
Figure 3:
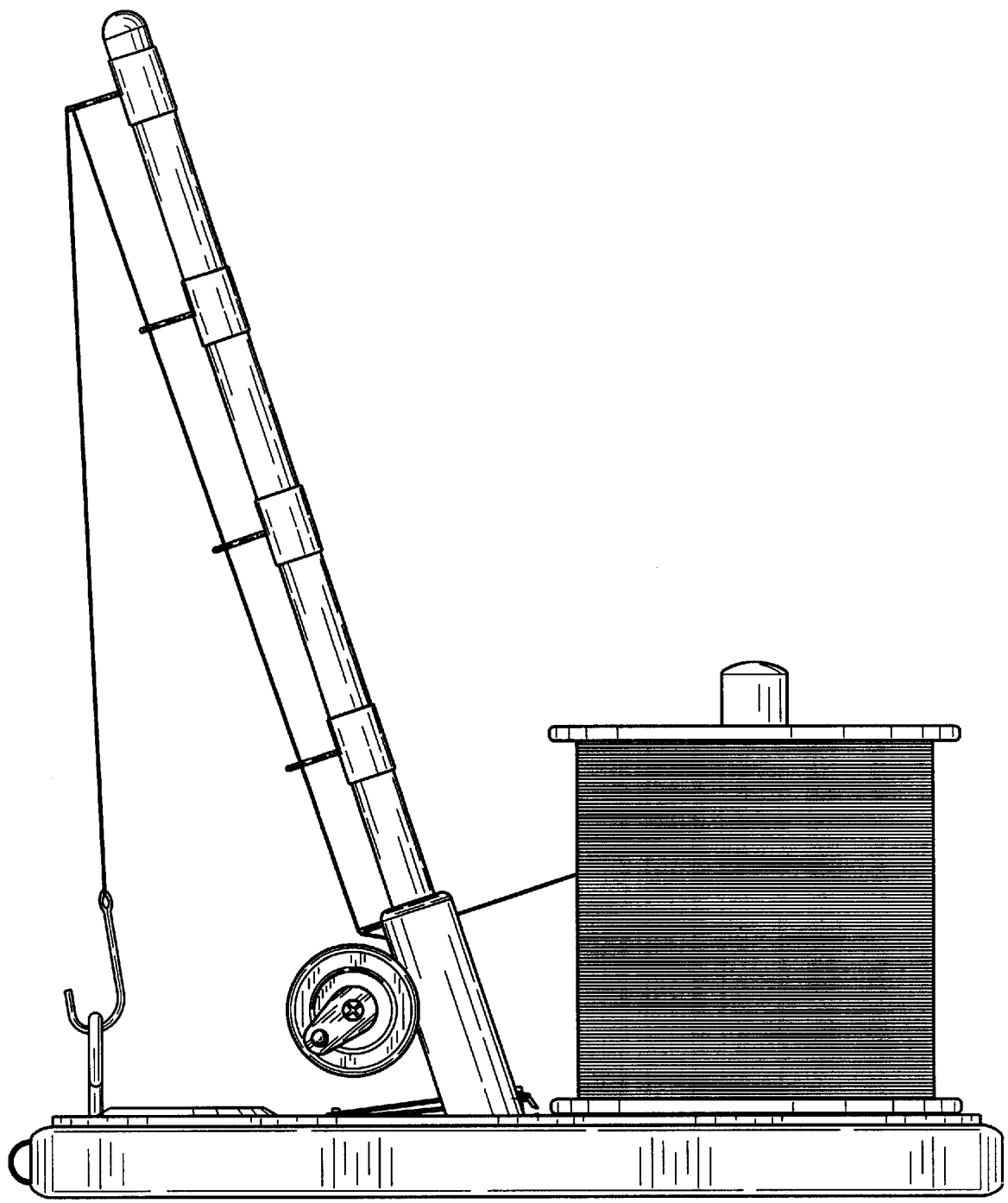
FIG. 3 is a right side view thereof.
Figure 4:
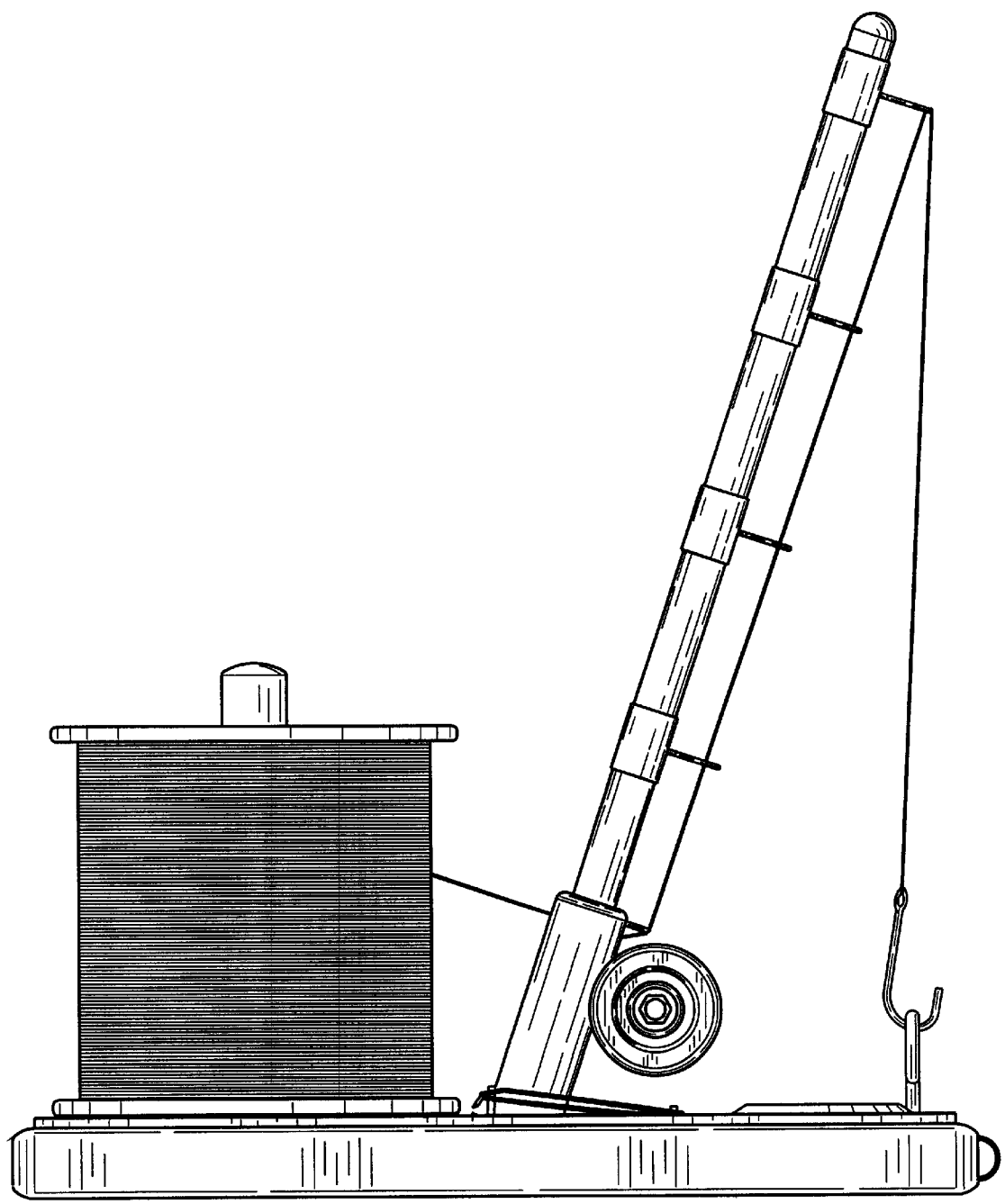
FIG. 4 is a left side view thereof.
Figure 5:
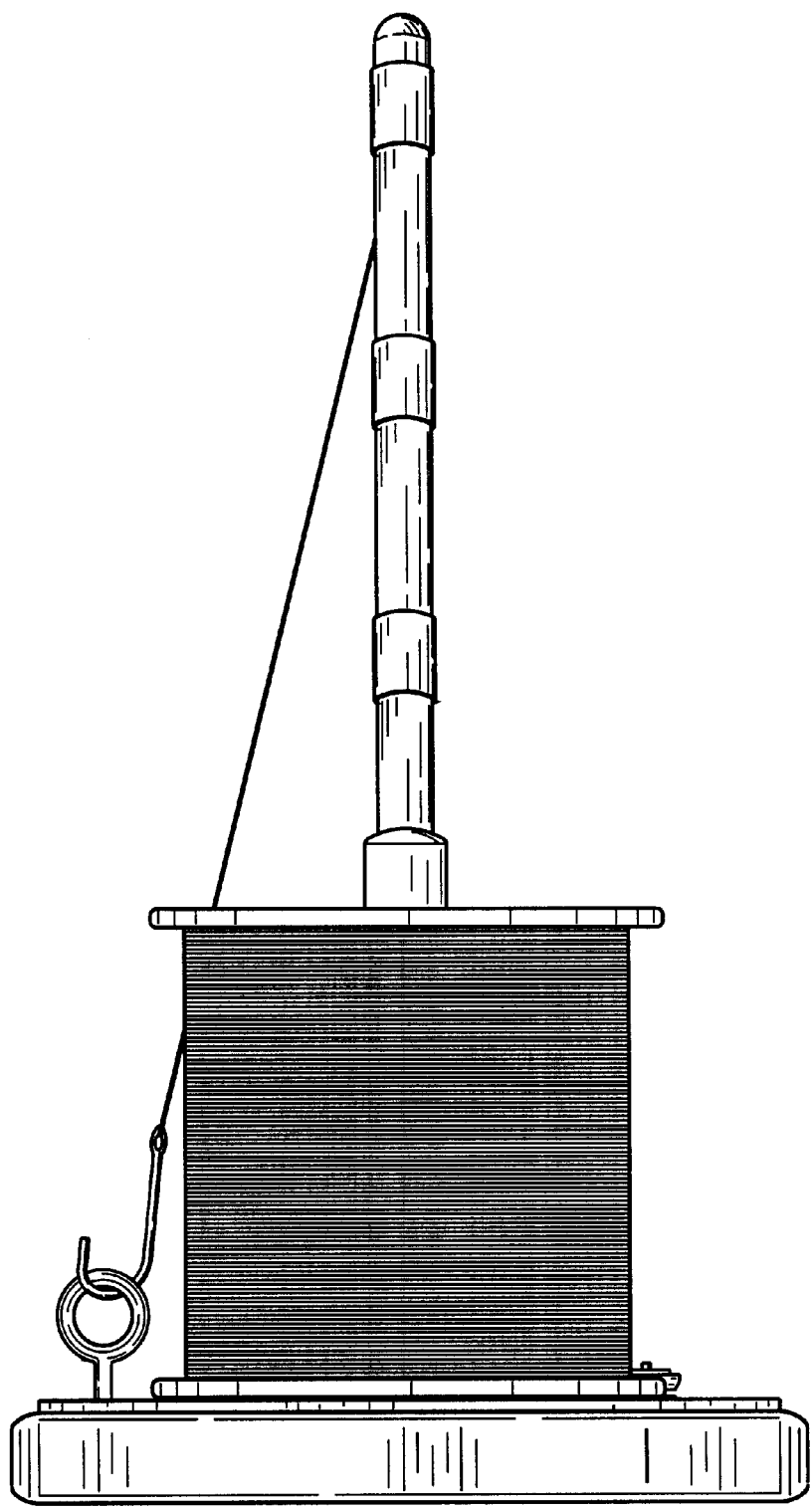
FIG. 5 is a perspective back view thereof.
Figure 6:
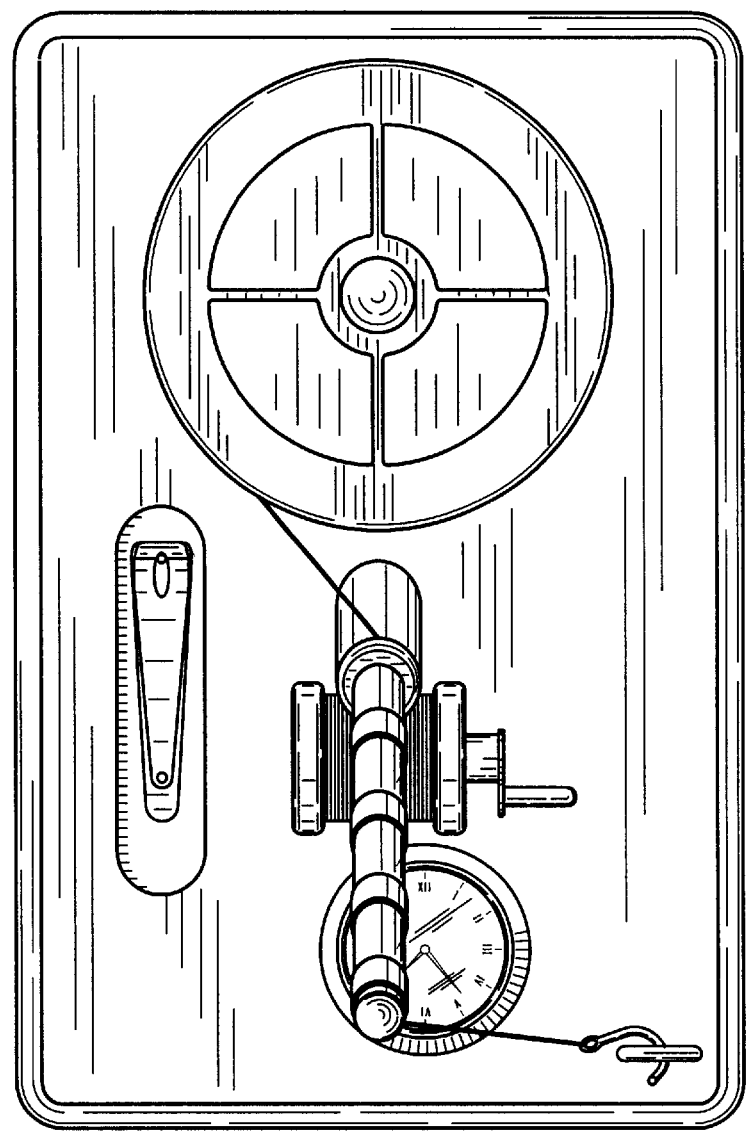
FIG. 6 is a top view thereof with instruction manual.
Figure 6:
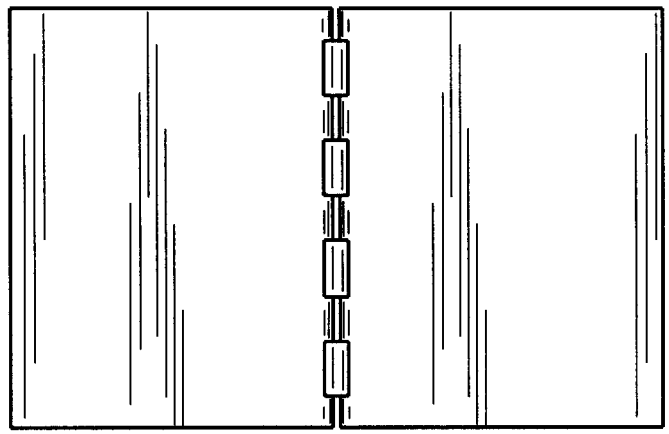
Figure 7:
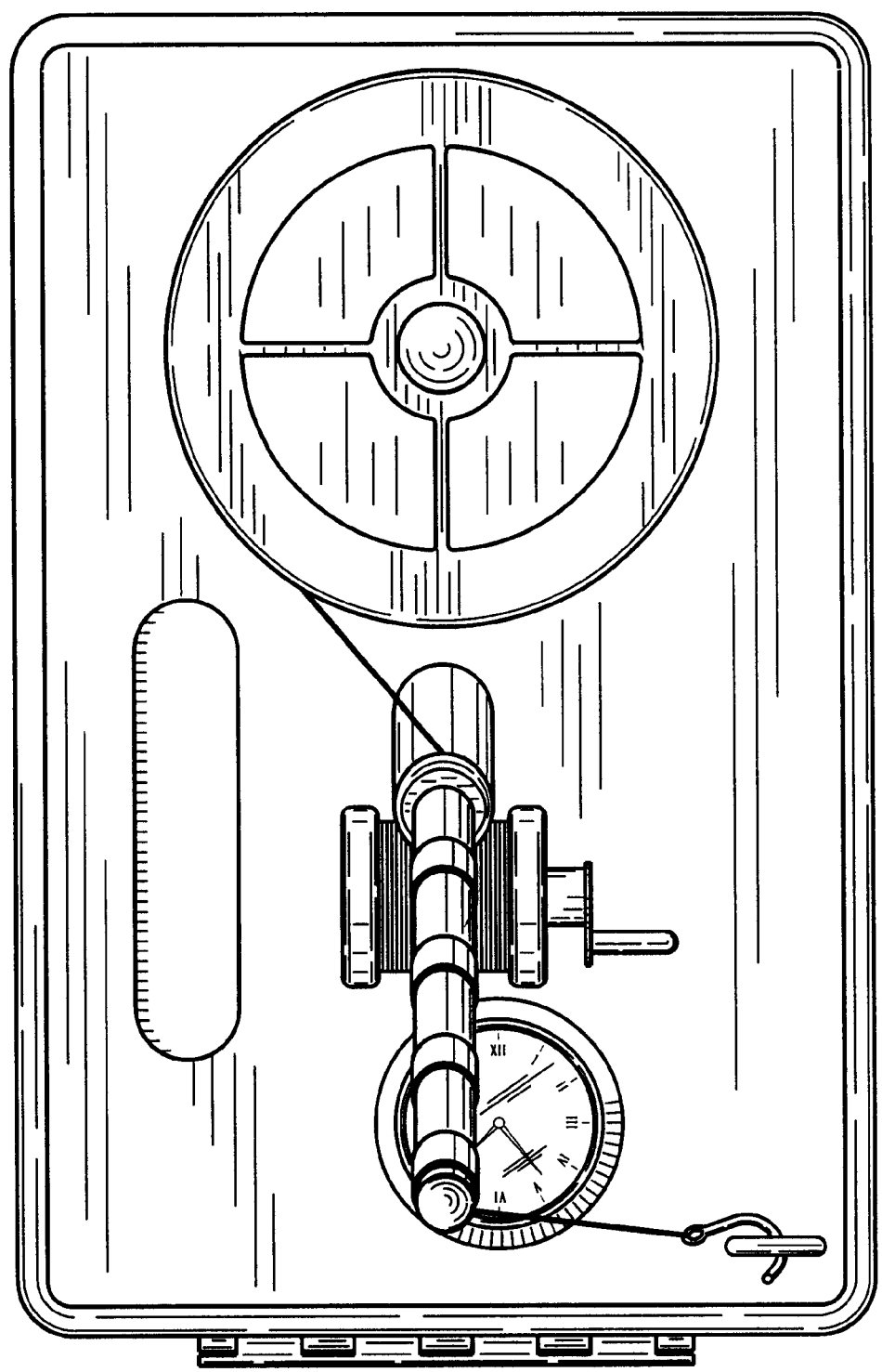
FIG. 7 is a top view thereof without clipper.
Figure 8:
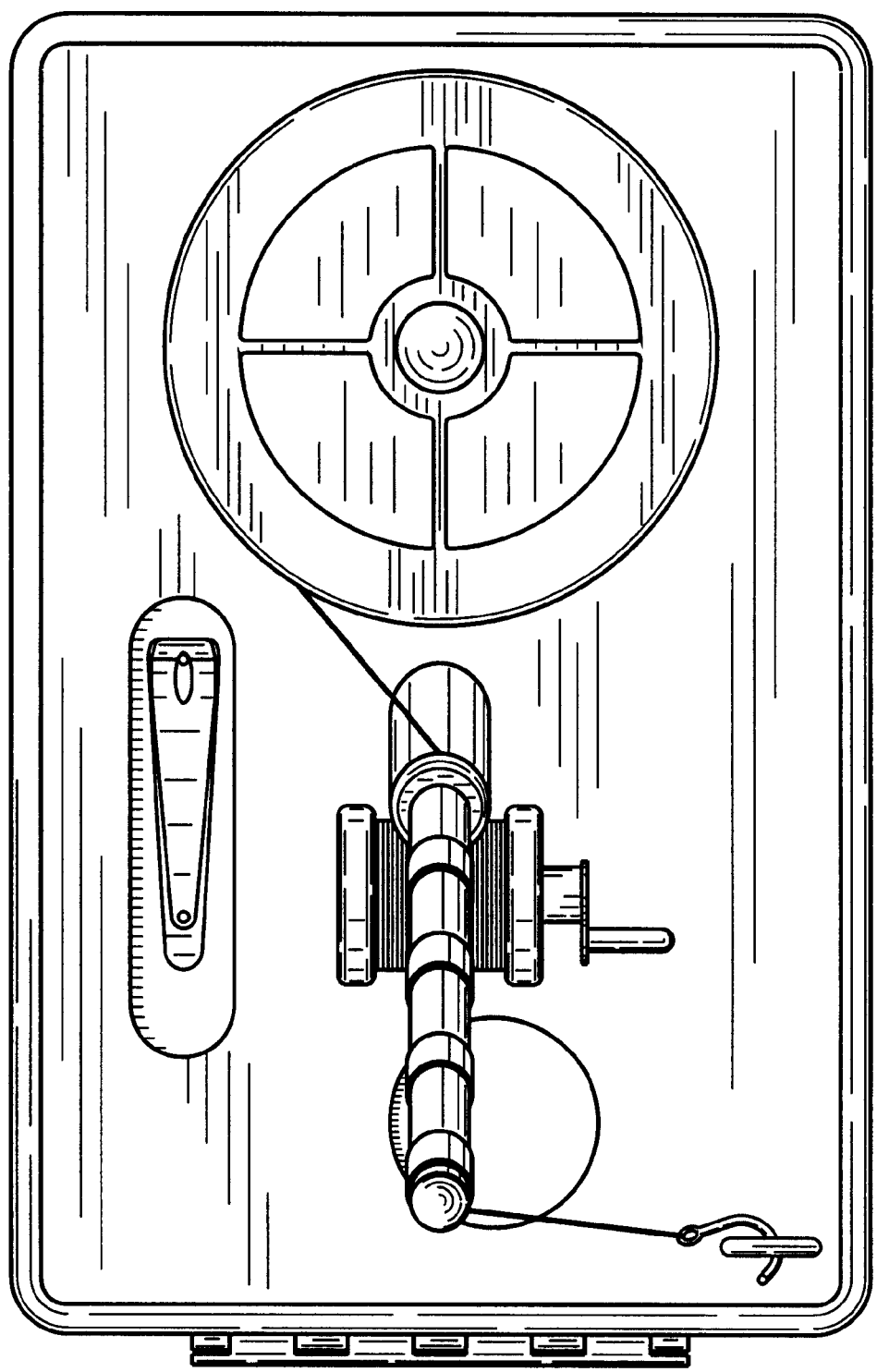
FIG. 8 is a top view thereof without watch.

This invention arose from a desire by the inventor to improve the ability of an operator to tie knots, so that the operator may carry out his/her occupation and hobbies with greater ease and lower expense.

This invention provides a knot-tying device useful for learning to manually tie a knot in an elastic material, comprising a body having top and bottom sides opposite to one another, the top side being provided with a center, left, right, front and back areas, and the bottom side generally provided for resting the device on a surface;

a first prong member extending upwardly from the top side of the body; and a length of flexible material that is operatively attached to the top side of the body, the flexible material having distal and proximal ends, whereby an operator operating the device may thread the proximal end of the flexible material through an opening of a second prong member in a pre-set pattern to form a knot.

In one embodiment, the device of the invention has the first prong member positioned proximate to a site selected from the group consisting of the center, left, right, front and back areas of the top side of the body. In another embodiment, the first prong member further comprises one or more pre-determined size opening(s) which allows threading therethrough of a flexible material, and the flexible material is threaded through the opening(s) of the first prong member. The first prong member may also be provided with one or more first flexible material holding member(s), and each first flexible material holding member containing one opening.

Another embodiment of the device provides a second prong member provided with an opening through which the proximal end of the flexible material is threaded prior to the knot tying process. In one example, the second prong member comprises a hook, and the device further comprises a securing member operatively attached to the top side of the body for securing the second prong member, e. g. a hook, when the device is not in use, the securing member being positioned at a distance from the first prong member and provided with a surface that accommodates and retains the second prong member, thereby preventing its contact with an operator's skin. The device may also comprise a second flexible material holding member that serves to store extra length of the flexible material. In one embodiment the second flexible material holding member is provided with a surface that accommodates the flexible material, e. g. wound up around it. This material holding member may take the form of a spool, or any other shape and design desired.

Of the various elements that form the present device 1 and kit 21, the body 2 and the first prong member may be formed of any material that will preserve its shape, e. g. wood, stone, glass, polymers or metal, among others, and may be solidly formed of one material or may be a composite, e. g. having layers of different materials for reinforcement. In addition, the body may be covered with a design, paint, varnish, and the like. Different types of polymers and co-polymers may be utilized as is known in the art, depending on the rigidity consistency, smoothness, color, etc. desired. The monomers may be mixed, a polymerization starter added with all other components needed, and the polymer shaped into the body or any other element of the device.

The flexible material is typically in the shape of a line, thread, cord or rope of varying diameters and lengths. The flexible material used for knot-tying, e. g. line, thread, cord or rope may be formed of cotton, silk, polymer, glass, metal or other flexible materials known in the art, and molded, cast, woven, or otherwise made into threaded, extruded or flaked fibers, among others, and formed into a flexible material suitable for tying knots.

In another embodiment, the body of the device may be further provided with a slot that is generally positioned between, and parallel to, the top and bottom sides thereof, the opening being designed for lodging instructions pages or a manual with instructions for tying a plurality of knots.

Variations on the above embodiments are clearly contemplated herein, including but not exclusively the ones described in the following paragraphs.

The first prong member of the device generally extends outwardly from the top side of the body along a longitudinal axis, which in some embodiments forms with the top side of the body an angle of about 45 to about 90 degrees, and is provided with one or more opening(s) of a size effective to thread the flexible material therethrough. In a preferred embodiment, the openings are positioned at an angle of about 60 to about 90 degrees from the longitudinal axis of the first prong member. In this embodiment, the first prong member is provided generally with one or more first flexible material holding member(s), each first flexible material holding member containing one of the openings and being positioned at a distance from one another along the first prong member longitudinal axis, wherein the proximal end of the flexible material is threaded through the openings prior to becoming available for knot tying.

In another preferred embodiment, the device has a second prong member provided with an opening, wherein the proximal end of the flexible material is threaded through the opening prior to tying a knot. In one embodiment, the second prong member comprises a first and second ends, the first end comprising the opening and the second end comprising a hook, and the device further comprises a security holding member operatively attached to the top side of the body for securing the hook when the device is not in use, the security holding member being positioned at a distance from the first prong member and provided with a surface that accommodates and retains the hook, thereby preventing contact of the hook with an operator's skin.

In yet another embodiment, the device 1 further comprises a second flexible material holding member for storing a length of flexible material. The second flexible material holding member may be a spool, and the length of flexible material may be wound up around it, with the material's distal end remaining buried or being tied to prevent its becoming loose, prior to the proximal end thereof being threaded through the openings of the first prong member to become available for knot tying.

The slot provided in the body of the device may be provided with a slidable floor member in an area carved out from the bottom side of the body. The slidable floor member is positioned parallel to and co-planarly to the bottom side of the body. This feature permits opening the slot to introduce or withdraw the instructions provided with the kit. The opening instruction sheets or manual with instruction sheets shows a plurality of knots and step by step provides instructions on how to tie them.

In yet another embodiment, a most preferred embodiment, the first prong member is provided with a further opening through which to thread the flexible material. This opening is preferably positioned within the height of the second flexible material holding member, and is positioned transversal to the first prong member's longitudinal axis preferably at an angle of about 50 to about 90 degrees thereof. In this device 1, the proximal end of the flexible material emerging from the second flexible material holding member, e. g. a spool, is threaded through the transversally positioned further opening prior to being threaded through the openings of the first prong member and become available for knot tying.

The present invention also provides a knot-tying kit, that comprises the device described above or its separate parts, which may also be partially assembled; a second prong member provided with a pre-defined size opening for threading through it the flexible material prior to tying a knot. When not in use, the second prong member is either lain in the kit, or is operatively attached to the top side of the body at a side other than the first prong member. The kit further comprises instructions for learning to tie a plurality of knots. The instructions may be provided in loose leaves, which for longer preservation may be embedded in a polymer or shrinked wrapped, or the leaves may be gathered in the form of a bound or spiral booklet. In one preferred embodiment, the paper or plastic leaves or the booklet are made of dimensions that permit it to fit in the slot present in the body of the device. The kit may further comprise an element selected from the group consisting of a flexible material cutter, a watch, one or more first flexible material holding member(s) with extra flexible material (spares), a third prong member or base for securing to the first prong member to the body through its top side, each third prong member or base containing one opening suitable for threading through it the flexible material, a securing member or gripping means designed for attaching to the top side of the body for securing the second prong member when the device is not in use, the securing member or gripping means being provided with a surface that grips the second prong member, thereby preventing contact of the second prong member with the operator's skin, which in some instances may be an opening where a hook is secured, and a second flexible material holding member for storing and making available the flexible material through a simple pull from its proximal end. The second holding member may be provided with a surface that accommodates the flexible material, e. g. a line, thread, cord or rope. Thus, when an operator pulls the proximal end of the flexible material, the second material holding member releases a certain length of the material, which is then available for tying a knot. Other elements may also be added to supplement the above described, either for their function or for their ornamental value.

Figure 9:
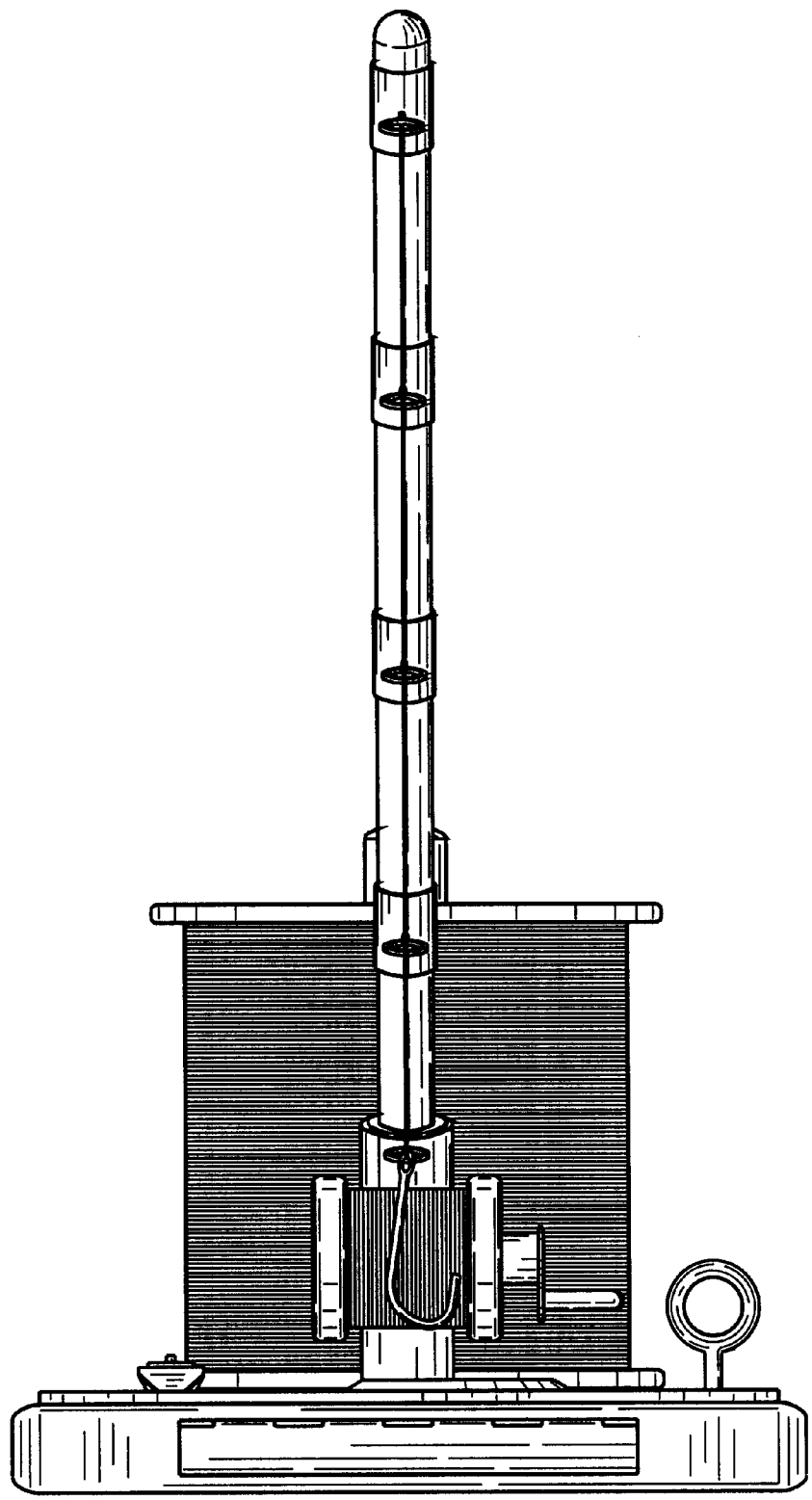
FIG. 9 is a perspective front view thereof with the hook untethered.
Figure 10:
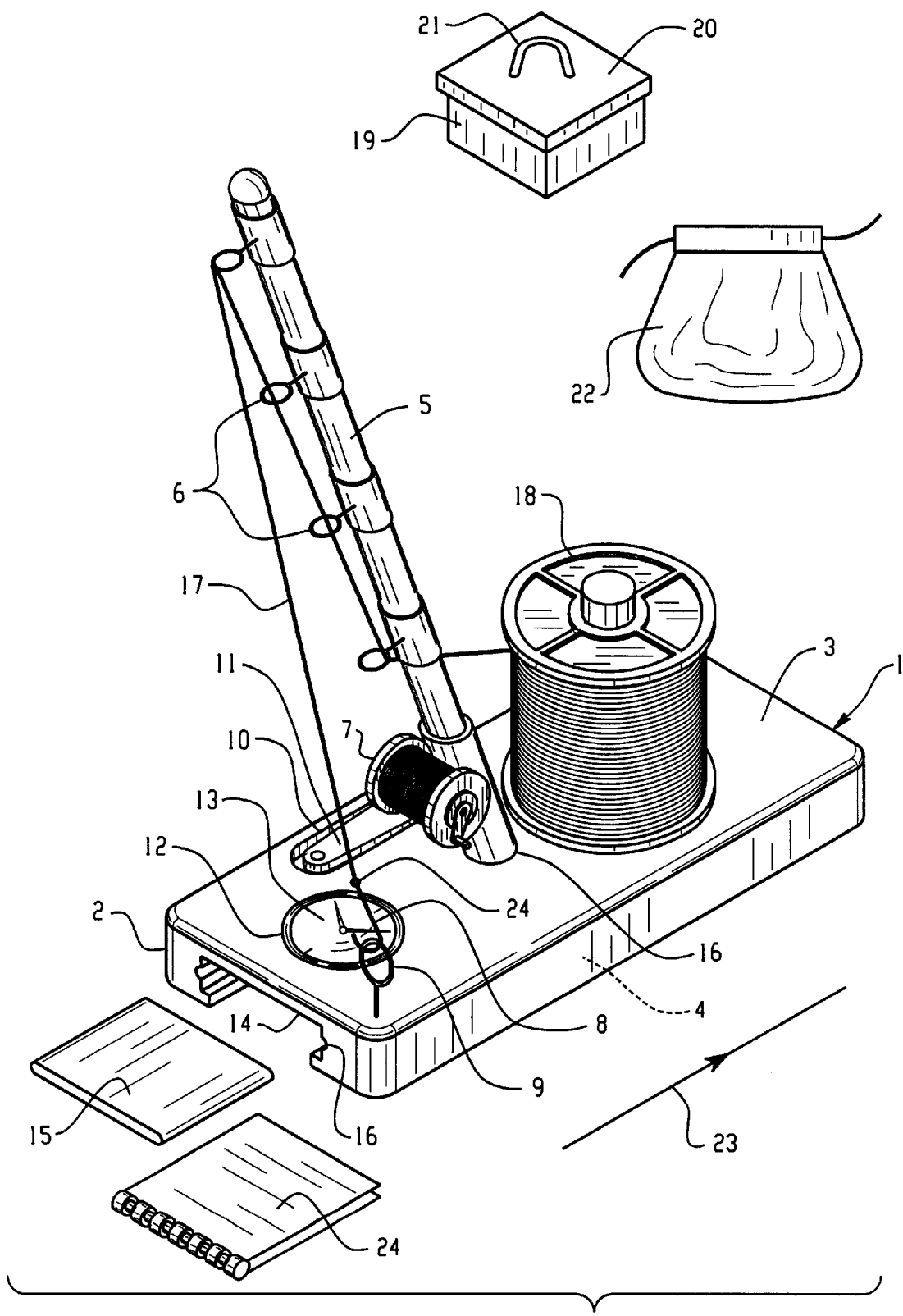
FIG. 10 is a schematic of the device and kit showing the different part that comprise them.

Now the invention will be described in connection with the photographs provided with this applications. FIGS. 1 to 9 are photographs of one embodiment of the present device and kit. FIG. 10 is a schematic showing the parts of the invention, and some of the packaging firms exemplified. FIG. 10 shows a knot-tying device 1 having a body 2 and top 3 and bottom 4 sides thereof. A first prong member 5 may be mounted on the top side of the body either directly (not shown) or via a base 16. The device 1 itself may be made of conventional materials, such as wood including laminates, glass, metals, including alloys, polymers and co-polymers, including mixtures, etc. Other materials, however, may also be utilized. The type of device illustrated by the photographs of FIGS. 1 to 9 has a lacquered wood body 2, a stripe painted wood first prong member 5, four metal line holding members 6, an ornamental wood and metal spool member 7, a line 17 proximally attached to a stainless steel second prong member in the form of a hook 8, threaded through the metal line holding members 6, and distally wound up onto a line storing member 18. In addition, the exemplified device 1 is also provided with one chromed securing or tethering member 9 holding the second prong member 8, a first depression 10 in the top side 3 of the body 2, which may lodge a line cutter 11, a second depression 12 in the top side 3 of the body 2 which may lodge a watch 13, optionally a stop watch for timing the progress made, an especially provided slot 14 seen in the front of the device 1, which opening may lodge a manual 24 with instructions, pictures of knots showing the steps to tie them. The slot 14 may be a cavity formed in the body 2, or it may have an insert 15 slidably inserted into side groves 16 positioned in the body 2 of the device 1 on the sides of the slot 14. FIG. 1 shows the device with the line attached to the second prong member tethered to the tethering member 9, whereas FIG. 9 shows the device 1 in an untethered position.

The kit 17 of the invention is comprised of all the elements shown in FIG. 10, which may be provided separately for assembly by the operator, or already partially or fully assembled. Replacements for the second material holding member 18 may also be provided in the kit 17, which may be shrink-wrapped or otherwise packaged, for example in a container 19, e. g. a case provided with a cover 20 with or without a closable flap (not shown in the drawing), which may additionally be provided with a handle 21. Other forms of containers may also be provided for the kit 17, such as a bag 22 formed of knitted material, and the like. The manufacture of all elements, the kit 17 and the container 19 is conducted by methods known in the art, that, therefore, need not be described in detail herein.

It must be emphasized, however, that other forms of the device 1 and kit 17 could be used instead. For example, the line cutter 11 may be a standard nail cutter, a scissors, and the like, and the watch 13 may be battery or quartz operated, a stop watch, and the like. The body 2 of the device 1 may have different shapes, which represent geometrical and non-geometrical figures. Examples of non-geometrical figures are those corresponding to the shape of a boat, a book, a fish, and many other figures. Examples of geometrical shapes are a square, a circle, a rectangle, a triangle, and figures with five or more identical and different length sides. Others are also contemplated within the confines of this invention.

The device 1 may be separate from or it may be part of, or be mounted inside, the container 20, which in addition may have collapsable sides that will expose the device 1. In the earlier case, the container 20 is of a shape, size and volume that allows for easy insertion of the device 1 for storage when not in use.

The grooves 16 of the device 1 have a shape that permits that their shape engage the slidable insert 15 provided with some embodiments, or in any other appropriate fashion. The grooves may be guide passages, which extend parallel to the longitudinal axis of the device 1 when observed from the front view. The two guide passages are arranged substantially parallel to one another and parallel to the longitudinal axis 23 of the device 1. However, although this is desirable from the point of view of enabling the insertion of slidable insert 15, other shapes and other guides may be formed in the body 2 of the device 1. The way in which the arrangement shown in FIGS. 1 to 10 are used in practice corresponds to solely one embodiment of the invention. Others are easily constructed, which have different shapes, designs, colors, materials, and the like. All these variations are part and parcel of this invention, as well.

At the start of the knot-tying procedure, the proximal end 24 of the flexible material 17 is loose, that is it is disengaged from the second prong member 8. The operator of the device 1, then reads the instructions provided, e. g. in a manual 24 contained in the kit 17, and proceeds to reproduce the steps indicated to form a desired type of knot. This sequence of events from beginning to end (formation of the knot) may be timed, and progress assessed by comparing the times required before and after practicing with the present invention.

The method just described serves to tie a single knot at a time. Other embodiments of the invention provide more than one set of elements positioned at different sites on the top surface of the body of the device. This embodiment may be utilized for group practice. The different knots used and the steps involved in tying them are known in the art and need not be described herein in further detail. It is common practice for a knot, e. g. a fishing or surgical knot to consist of more than one, for example two or three, half-hitches, and this may be achieved by repeating the steps indicated to tie them. The present device 1 and kit 17 may be applied to tie a self-lock slipknot and many more types of knots known in the art. Apart from the differences in the knots themselves, the procedure used is the same as that just described with reference to the Figures.

The method of the invention helps to practice tying a knot with a flexible material such as a line, thread, cord or rope, essentially by providing the kit of the invention described above;

securing one or more first material holding member(s) to the first prong member, each first material holding member containing one opening suitable for threading through it the material;

attaching to the top side of the body a securing member or gripping means designed for securing the second prong member when the device is not in use, the securing member or gripping means being provided with a surface that grips the second prong member, thereby preventing contact of the second prong member with the operator's skin;

securing onto the top side of the body a second material holding member provided with a surface comprising a certain length of flexible material and exposing a proximal end thereof wound up around it;

pulling the proximal end of the material so that the second material holding member releases a certain length of material;

threading the proximal end of the material through the opening of the second prong member; and tying a knot in accordance with the instructions.

By following the steps included in the formation of each type of knot, different knots will be produced to secure the second prong member.

It should be noted that the above description and accompanying drawings are only used to illustrate one embodiment of the present invention, not intended to limit the scope thereof. Any modification of the embodiment should fall within the scope of the present invention.

What is claimed as novel and unobvious in United States Letters Patent is:

1. A knot-tying device useful for learning to manually tie a knot in a flexible material, comprising a body having top and bottom sides opposite to one another, the top side being provided with a center, left, right, front and back areas, and the bottom side generally provided for resting the device on a surface;

a first prong member extending upwardly from the top side of the body;

a second prong member, the second prong member comprises first and second ends, the first end comprising the opening and the second end comprising a hook; and a length of a flexible material operatively attached to the top side of the body, the flexible material having distal and proximal ends, whereby an operator operating the device may thread the proximal end of the flexible material through the opening of the second prong member in a pre-set pattern to form a knot.

2. The device of claim 1, wherein the first prong member is positioned proximate to a site selected from the group consisting of the center, left, right, front and back areas of the top side of the body.

3. The device of claim 1, wherein the first prong member extends outwardly from the top side of the body along a longitudinal axis forming with the top side an angle of about 45 to 90 degrees, and is provided with at least one opening of a size effective to thread the flexible material therethrough, the openings being positioned at an angle of about 60 to about 90 degrees from the longitudinal axis of the first prong member.

4. The device of claim 3, wherein the first prong member is provided with at least one flexible material holding member, each flexible holding member containing one of the openings and being positioned at a distance from one another along the first prong member longitudinal axis, wherein the proximal end of the flexible material is threaded through the openings prior to becoming available for knot tying.

5. The device of claim 1, further comprising a security holding member operatively attached to the top side of the body for securing the hook when the device is not in use, the security holding member being positioned at a distance from the first prong member and provided with a surface that accommodates and retains the hook, thereby preventing contact of the hook with an operator's skin.

6. The device of claim 5, further comprising a second flexible material holding member for storing a length of flexible material.

7. The device of claim 6, wherein the second flexible material holding member comprises a spool, and the length of flexible material is wound up around the spool including the material's distal end, prior to the proximal end thereof being threaded through the openings of the first prong member to become available for knot tying.

8. The device of claim 1, wherein the body and the first prong member are formed of wood, stone, glass, polymer, or metal; and the flexible material is formed of cotton, silk, polymer, glass, or metal.

9. The device of claim 1, wherein the flexible material comprises a line, fibers, thread, cord or rope.

10. The device of claim 1, wherein the body is further provided with a slot positioned parallel to and between the top and bottom sides thereof, the opening being designed for lodging instructions sheets or a manual with instruction sheets showing a plurality of knots and steps to tie them.

11. The device of claim 7, wherein the first prong member is provided with a further opening through which to thread the flexible material, the further opening being positioned transversal to the first prong member's longitudinal axis at an angle of about 50 to about 90 degrees thereof, wherein the proximal end of the flexible material is threaded through the transversally positioned further opening prior to being threaded through the openings of the first prong member and become available for knot tying.

12. A knot-tying kit, comprising
the device of claim 1;
wherein when not in use at least one of the group consisting of the second prong member is lain in the kit, and the second prong member is operatively attached to the top side of the body at a side other than that of the first prong member;
instructions for learning to tie a plurality of knots.

13. The kit of claim 12, further comprising an element selected from the group consisting of
a line cutter, thread cutter, cord cutter and rope cutter.

14. The kit of claim 13 further comprising a watch.

15. The kit of claim 14 further comprising at least one third prong member for securing to the first prong member, the third prong member containing one opening suitable for threading through it the flexible material.

16. The kit of claim 15 further comprising a fourth member selected from the group consisting of prong member and gripping means, the fourth member designed for attaching to the top side of the body for securing the second prong member when the device is not in use, the fourth member being provided with a surface that grips the second prong member, thereby preventing contact of the second prong member with the operator's skin.

17. The kit of claim 16 further comprising a fifth prong member having a surface that accommodates the flexible material, wherein the flexible material is wound up around the fifth prong member and when an operator pulls the proximal end of the flexible material, the fifth prong member releases a certain length of the flexible material.

18. A method of practicing tying a knot with a flexible material, comprising
(a) providing a knot tying kit, the kit comprising:
a body having top and bottom sides opposite to one another, the top side being provided with a center, left, right, front and back areas, and the bottom side generally provided for resting the device on a surface;
a first prong member extending upwardly from the top side of the body;
a second prong member, the second prong member comprises first and second ends, the first end comprising the opening and the second end comprising a hook; and
a length of a flexible material operatively attached to the top side of the body, the flexible material having distal and proximal ends, whereby an operator operating the device may thread the proximal end of the flexible material through the opening of the second prong member in a pre-set pattern to form a knot;
instructions for learning to tie a plurality of knots;
wherein when not in use at least one of the group consisting of the second prong member is lain in the kit, and the second prong member is operatively attached to the top side of the body at a side other than that of the first prong member;

(b) securing at least one third prong member to the first prong member, each third prong member containing one opening suitable for threading through it the flexible material;

(c) attaching to the side of the body a fourth member selected from the group consisting of a prong member and gripping means, the fourth member designed for securing the second prong member when the device is not in use, the fourth member being provided with a surface that grips the second prong member, thereby preventing contact of the second prong member with the operator's skin; and (d) securing to the top side of the body a fifth prong member provided with a surface comprising a certain length of flexible material exposing a proximal end thereof wound up around it;

(e) pulling the proximal end of the flexible material so that the fifth prong member releases a certain length of flexible material; and (f) tying a knot in accordance with the instructions.

* * * * *